US011350025B2

(12) United States Patent
Woo et al.

(10) Patent No.: US 11,350,025 B2
(45) Date of Patent: May 31, 2022

(54) OPTICAL DEVICE AND MOBILE TERMINAL COMPRISING SAME

(71) Applicant: LG ELECTRONICS INC., Seoul (KR)

(72) Inventors: Sungmin Woo, Seoul (KR); Byeongkil Kang, Seoul (KR); Jongpil Kim, Seoul (KR); Jeeho Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 16/981,641

(22) PCT Filed: Oct. 16, 2018

(86) PCT No.: PCT/KR2018/012205
§ 371 (c)(1),
(2) Date: Sep. 16, 2020

(87) PCT Pub. No.: WO2019/177219
PCT Pub. Date: Sep. 19, 2019

(65) Prior Publication Data
US 2021/0063681 A1 Mar. 4, 2021

Related U.S. Application Data

(60) Provisional application No. 62/643,771, filed on Mar. 16, 2018.

(51) Int. Cl.
*H04N 5/232* (2006.01)
*G02F 1/29* (2006.01)
(Continued)

(52) U.S. Cl.
CPC ......... *H04N 5/232122* (2018.08); *G02B 3/14* (2013.01); *G02B 7/04* (2013.01);
(Continued)

(58) Field of Classification Search
CPC ............ G02B 2207/115; G02B 26/004; G02B 26/005; G02B 3/14; G02B 5/005;
(Continued)

(56) References Cited

U.S. PATENT DOCUMENTS 7,324,287 B1 1/2008 Gollier
9,128,350 B1 9/2015 Lee
(Continued)

FOREIGN PATENT DOCUMENTS

EP 2996325 3/2016
EP 3255491 12/2017
(Continued)

OTHER PUBLICATIONS

PCT International Application No. PCT/KR2018/012205, Notification of Transmittal of the International Search Report and the Written Opinion of the International Searching Authority, or Declaration dated Feb. 7, 2019, 10 pages.
(Continued)

*Primary Examiner* — Mekonnen D Dagnew
(74) *Attorney, Agent, or Firm* — Lee, Hong, Degerman, Kang & Waimey PC

(57) ABSTRACT

Provided is an optical device for reducing the time for auto focusing (AF) performed by a contrast detection system, the optical device comprises a liquid lens having a curvature that varies on the basis of an applied electrical signal and the liquid lens may be auto-focused at one time from the current curvature (i.e., the first curvature state, p) to a target curvature corresponding to a distance to the subject (i.e., a second curvature state) based on the FV slope ratio.

14 Claims, 12 Drawing Sheets

(51) Int. Cl.

| | | |
|---|---|---|
| *G02B 3/14* | (2006.01) | |
| *G02B 7/04* | (2021.01) | |
| *G02B 26/00* | (2006.01) | |
| *G06F 3/041* | (2006.01) | |
| *H04N 5/225* | (2006.01) | |
| *G02B 7/09* | (2021.01) | |
| *H04M 1/02* | (2006.01) | |

(52) U.S. Cl.
CPC ............. *G02B 7/09* (2013.01); *G02B 26/004* (2013.01); *G02B 26/005* (2013.01); *G02F 1/29* (2013.01); *G06F 3/041* (2013.01); *H04M 1/0264* (2013.01); *H04N 5/2253* (2013.01); *H04N 5/2254* (2013.01); *H04N 5/23264* (2013.01); *H04N 5/232123* (2018.08); *H04N 5/232935* (2018.08); *G02F 1/294* (2021.01)

(58) Field of Classification Search
CPC ... G02B 7/04; G02B 7/08; G02B 7/09; G02B 7/36; G02F 1/29; G02F 1/294; G06F 3/041; H04M 1/0264; H04M 2250/52; H04N 5/2253; H04N 5/2254; H04N 5/232122; H04N 5/232123; H04N 5/23264; H04N 5/232935
See application file for complete search history.

(56) References Cited

U.S. PATENT DOCUMENTS

| | | | |
|---|---|---|---|
| 9,690,160 B2 | 6/2017 | Ye et al. | |
| 9,910,246 B2* | 3/2018 | Zohrabyan | ............... G02B 7/36 |
| 10,268,036 B1 | 4/2019 | Schultz et al. | |
| 2009/0072037 A1* | 3/2009 | Good | ................. G06K 7/10702 |
| | | | 235/462.35 |
| 2009/0171620 A1* | 7/2009 | Addy | ..................... G01B 11/04 |
| | | | 702/155 |
| 2009/0213321 A1 | 8/2009 | Galstian et al. | |
| 2009/0302197 A1 | 12/2009 | Uchino et al. | |
| 2010/0254021 A1 | 10/2010 | Yoshida et al. | |
| 2010/0295987 A1 | 11/2010 | Berge | |
| 2012/0013760 A1* | 1/2012 | Parodi-Keravec | ........................... |
| | | | G01M 11/0264 |
| | | | 348/222.1 |
| 2012/0140167 A1 | 6/2012 | Blum | |
| 2013/0128223 A1 | 5/2013 | Wood et al. | |
| 2013/0306480 A1 | 11/2013 | Chang et al. | |
| 2014/0191107 A1 | 7/2014 | Lee et al. | |
| 2015/0085173 A1 | 3/2015 | Chun et al. | |
| 2015/0223669 A1 | 8/2015 | Goldfain | |
| 2016/0360121 A1 | 12/2016 | Cheng et al. | |
| 2017/0094210 A1 | 3/2017 | Galor Gluskin | |
| 2019/0279354 A1 | 9/2019 | Inazumi et al. | |

FOREIGN PATENT DOCUMENTS

| | | |
|---|---|---|
| JP | 2012128029 | 7/2012 |
| JP | 2014186227 | 10/2014 |
| JP | 2015108712 | 6/2015 |
| KR | 100835108 | 6/2008 |
| KR | 1020090018579 | 2/2009 |
| KR | 1020140008699 | 1/2014 |
| KR | 1020140089852 | 7/2014 |
| KR | 1020140111062 | 9/2014 |
| KR | 1020150100394 | 9/2015 |
| KR | 1020150113538 | 10/2015 |
| KR | 1020160074658 | 6/2016 |
| KR | 1020170067634 | 6/2017 |
| KR | 1020170139982 | 12/2017 |
| KR | 101821189 | 1/2018 |
| WO | 2017188798 | 11/2017 |

OTHER PUBLICATIONS

PCT International Application No. PCT/KR2018/012199, Notification of Transmittal of the International Search Report and the Written Opinion of the International Searching Authority, or Declaration dated Feb. 14, 2019, 11 pages.
PCT International Application No. PCT/KR2018/012195, Notification of Transmittal of the International Search Report and the Written Opinion of the International Searching Authority, or Declaration dated Jan. 22, 2019, 11 pages.
PCT International Application No. PCT/KR2018/012207, Notification of Transmittal of the International Search Report and the Written Opinion of the International Searching Authority, or Declaration dated Jan. 31, 2019, 13 pages.
European Patent Office Application Serial No. 18910169.4, Search Report dated Nov. 30, 2021, 6 pages.
European Patent Office Application Serial No. 18909706.6, Search Report dated Dec. 6, 2021, 10 pages.
European Patent Office Application Serial No. 18909504.5, Search Report dated Dec. 7, 2021, 12 pages.
Schuhladen, "Miniaturized tunable apertures" Research in Micro-optics, vol. 20, Jan. 2016, 178 pages.
United States Patent and Trademark Office U.S. Appl. No. 16/981,335, Office Action dated Mar. 31, 2022, 25 pages.
United States Patent and Trademark Office U.S. Appl. No. 16/981,340, Notice of Allowance dated Apr. 12, 2022, 21 pages.

* cited by examiner

[FIG. 1a]
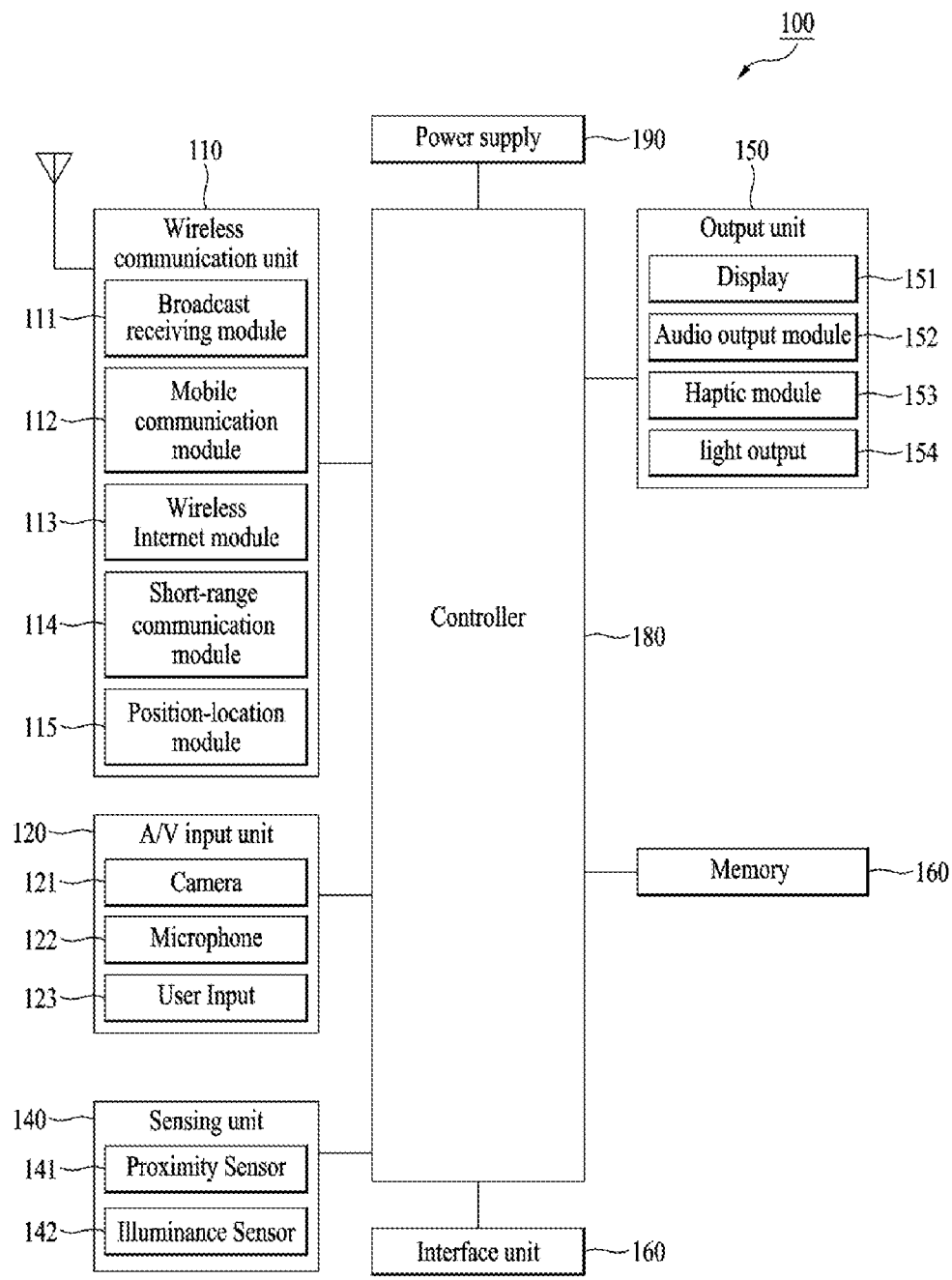

[FIG. 1b]
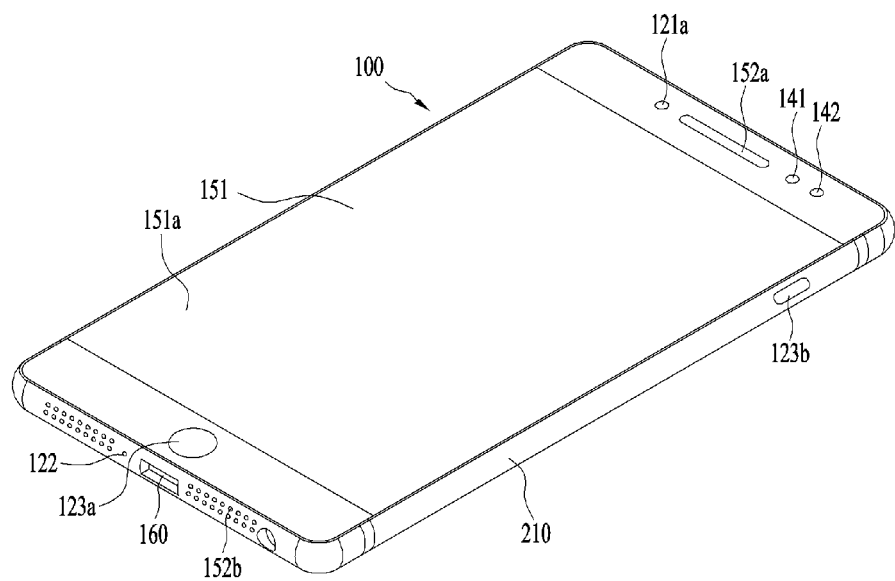
[FIG. 1c]
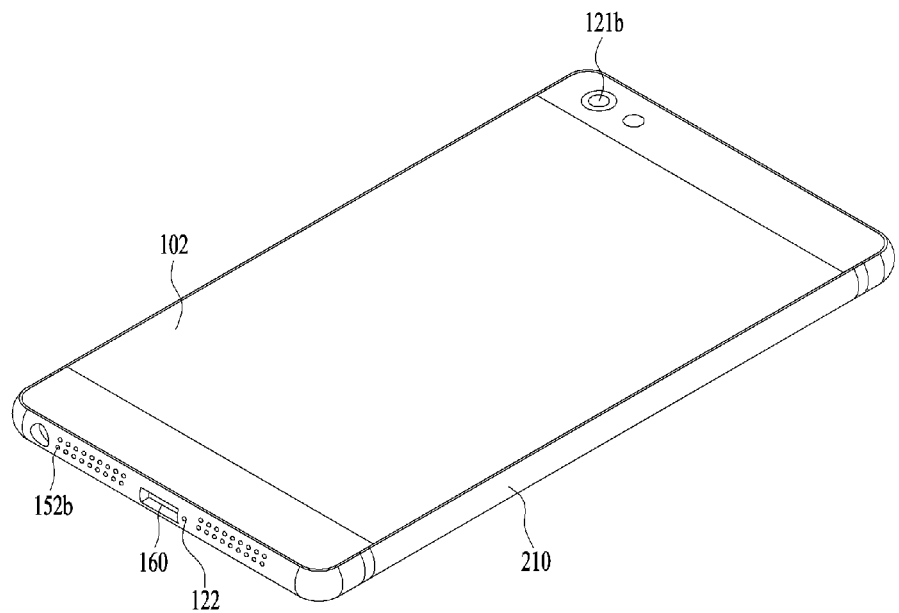

[FIG. 2]
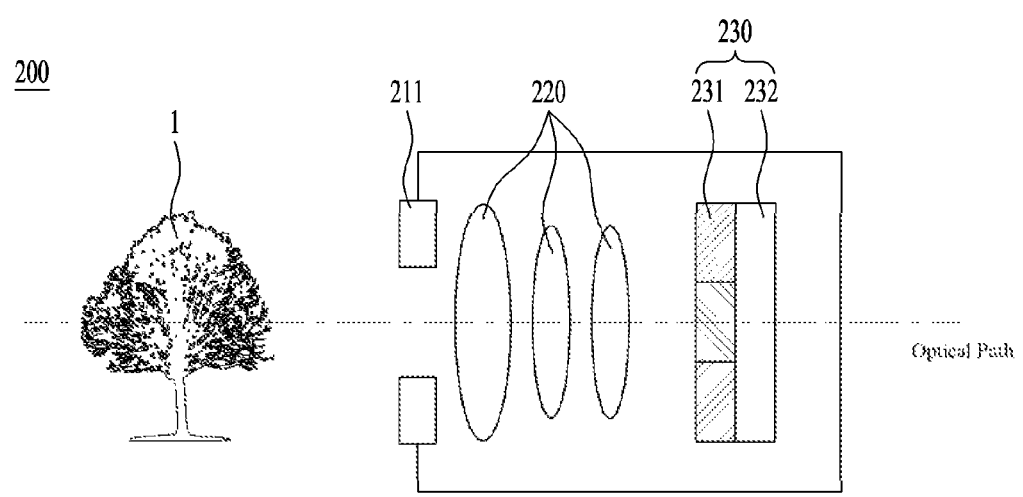

[FIG. 3]
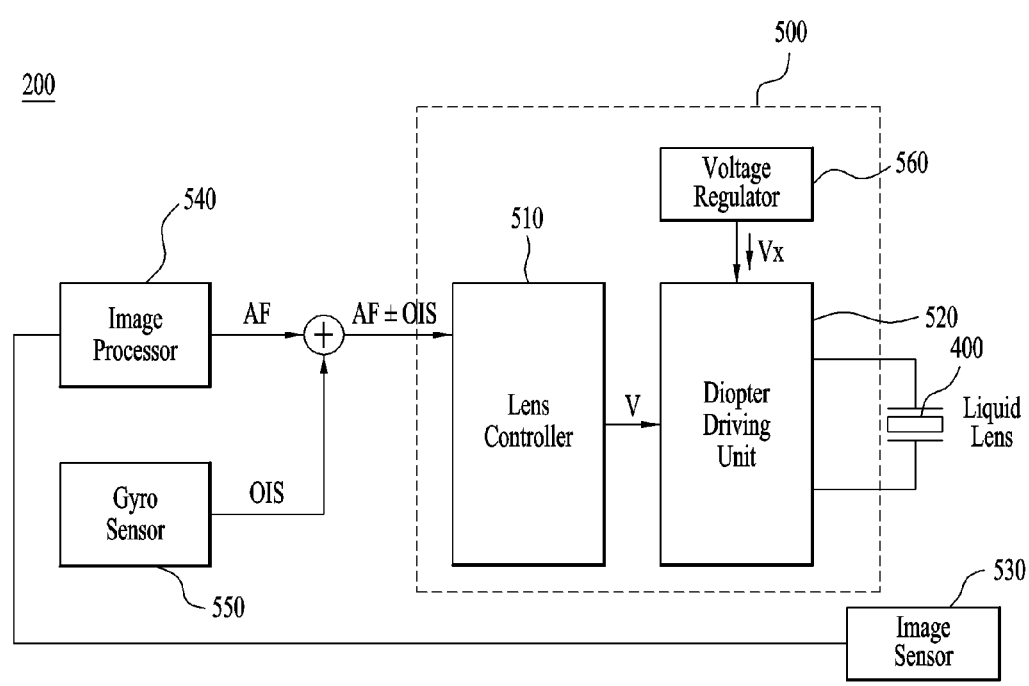

[FIG. 4]
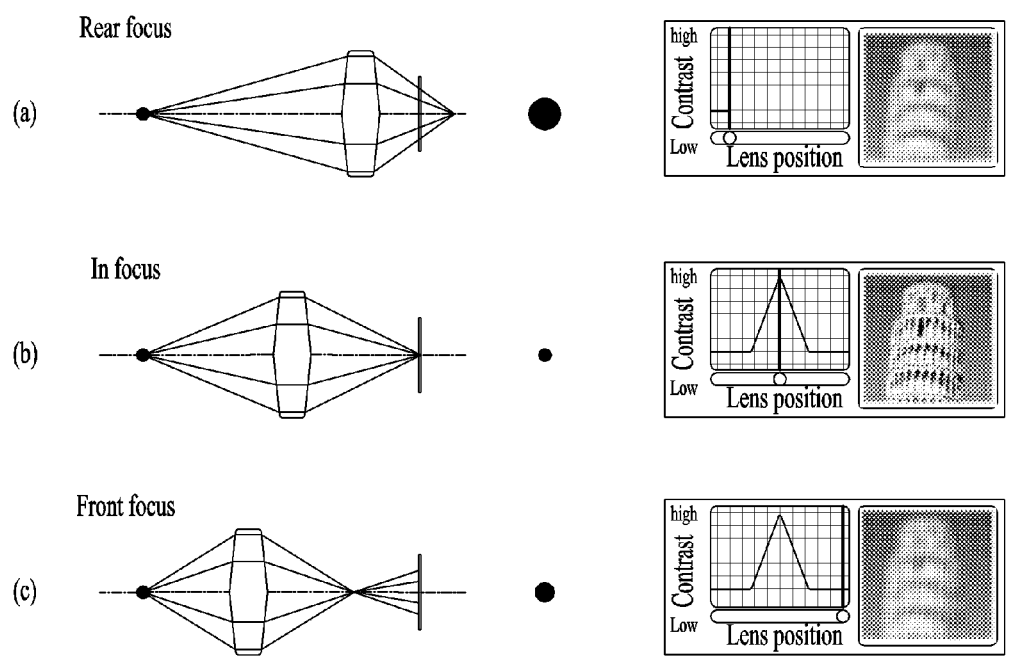

[FIG. 5]
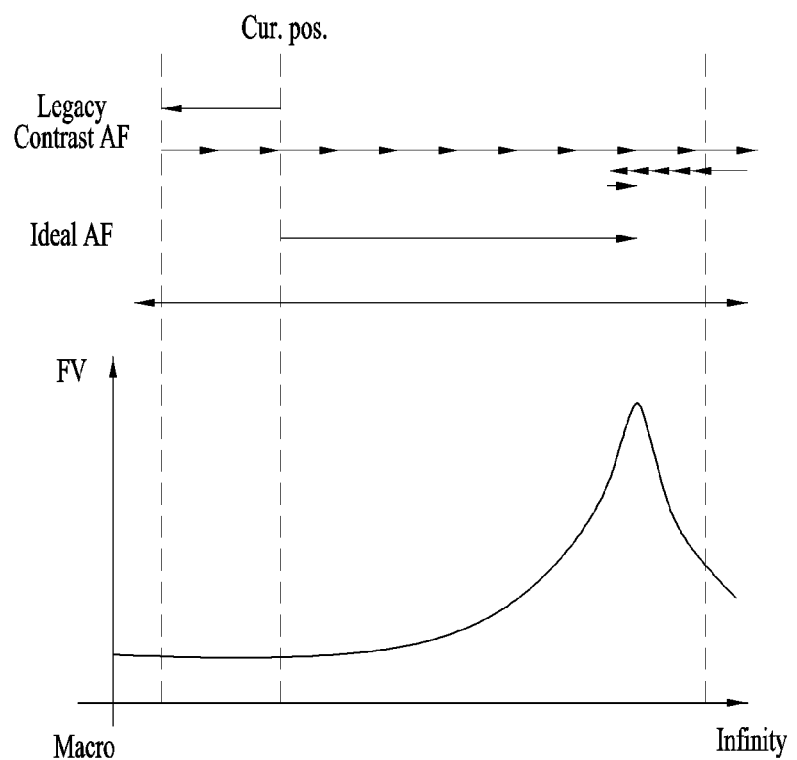

[FIG. 6]
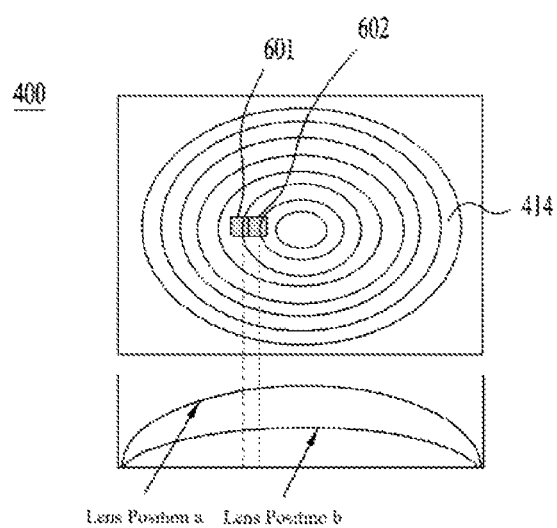

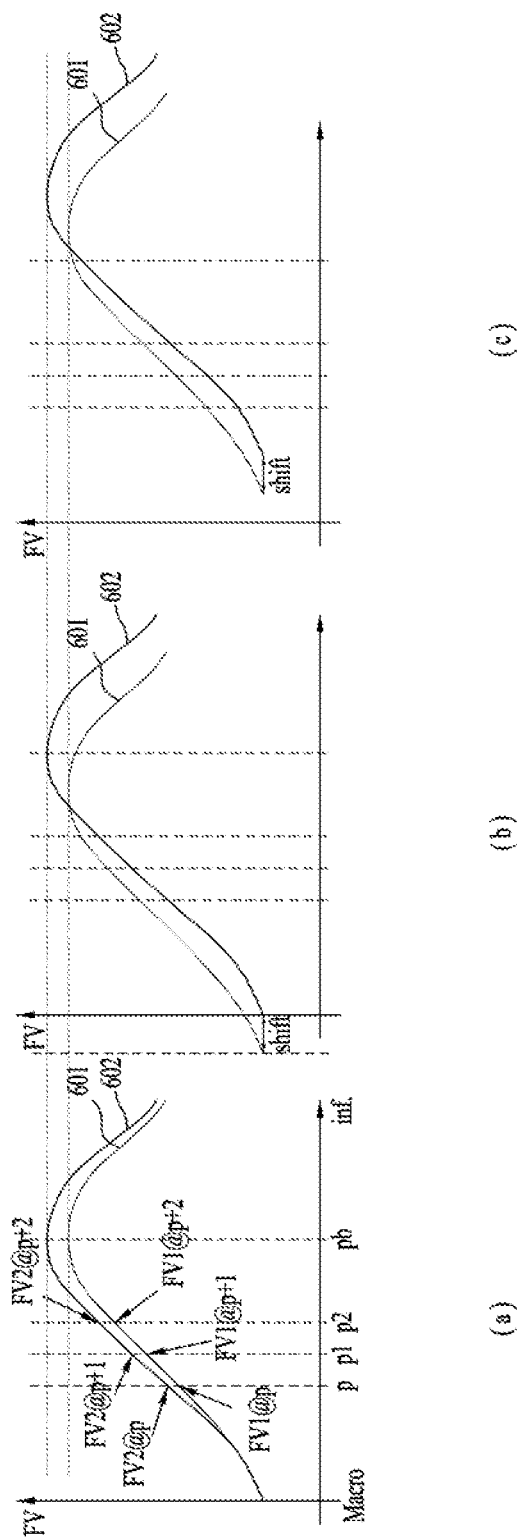
[FIG. 7]

[FIG. 8]
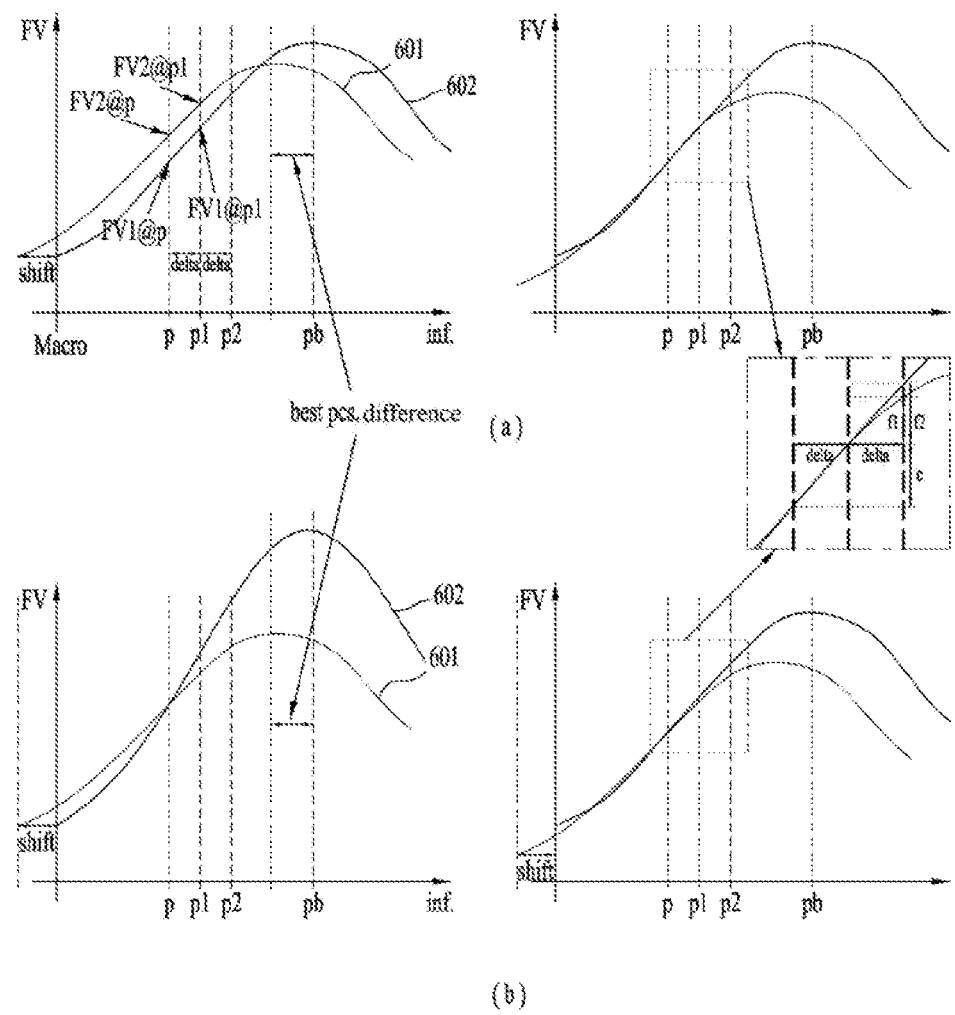

[FIG. 9]
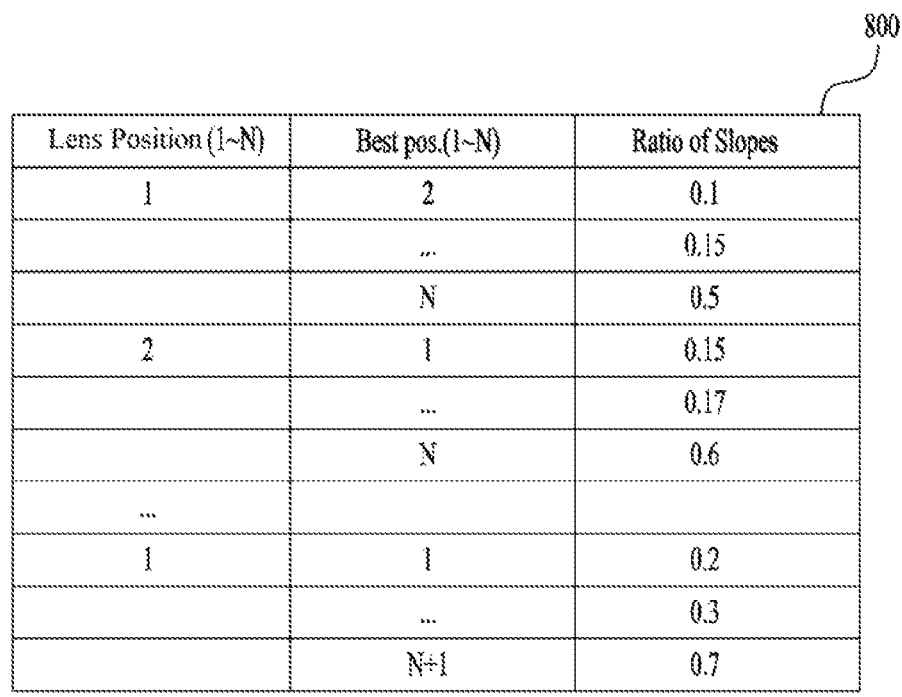

[FIG. 10]
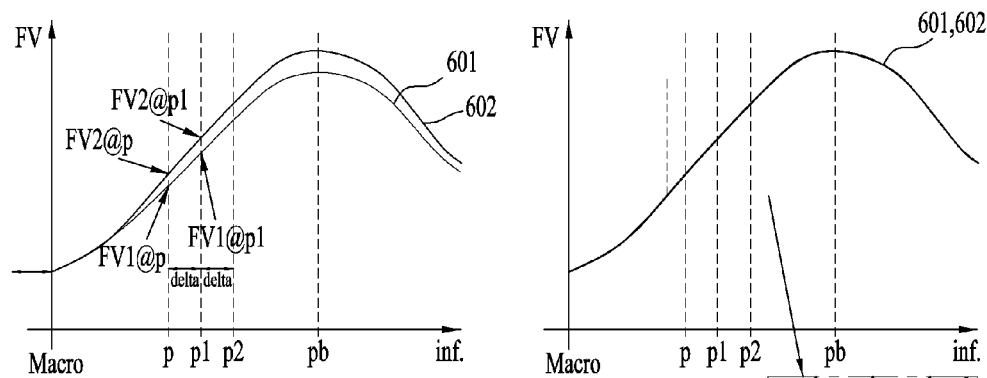
(a)
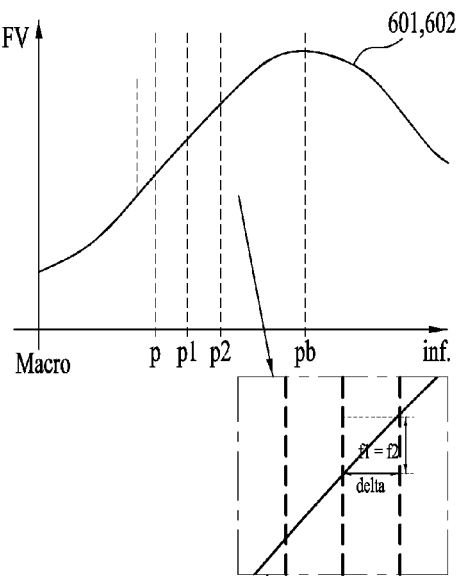
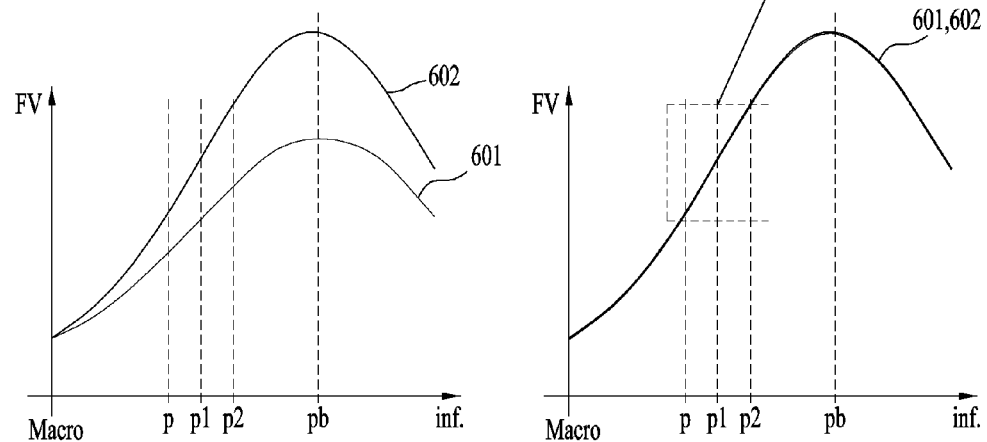
(b)

[FIG. 11]
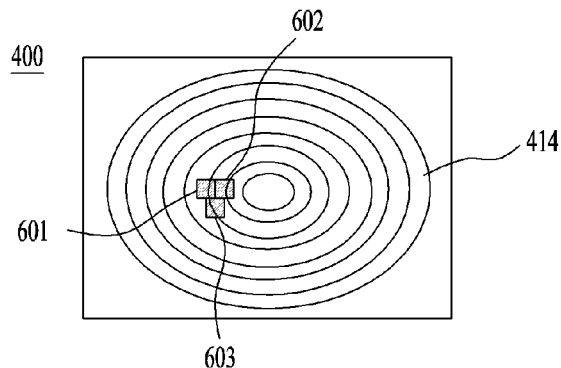
[FIG. 12]
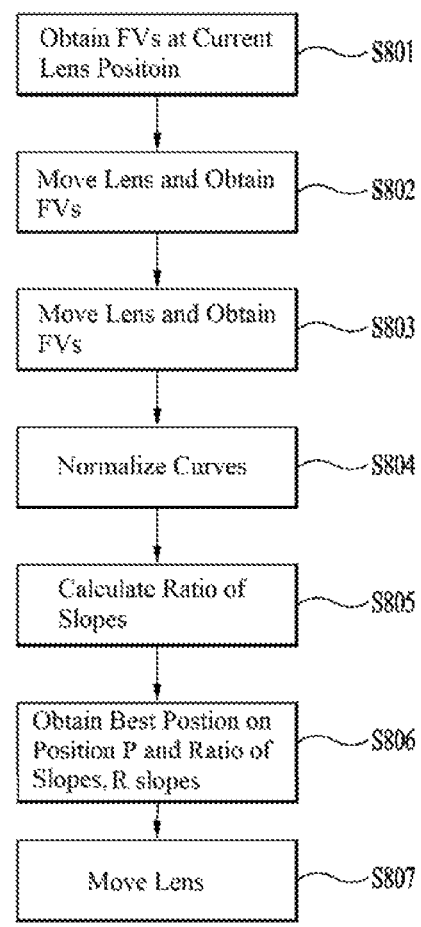

OPTICAL DEVICE AND MOBILE TERMINAL COMPRISING SAME

CROSS-REFERENCE TO RELATED APPLICATIONS

This application is the National Stage filing under 35 U.S.C. 371 of International Application No. PCT/KR2018/012205, filed on Oct. 16, 2018, which claims the benefit of U.S. Provisional Application No. 62/643,771, filed on Mar. 16, 2018, the contents of which are all hereby incorporated by reference herein in their entirety.

TECHNICAL FIELD

The present disclosure relates to an optical device and a mobile terminal including the same, and more particularly, to an optical device with a liquid lens, for reducing time taken for auto focusing and a mobile terminal including the optical device.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal may support more complicated functions such as capturing images or video, reproducing music or video files, playing games, receiving broadcast signals, and the like. By comprehensively and collectively implementing such functions, the mobile terminal may be embodied in the form of a multimedia player or device.

As one of the functions of multimedia devices, photo-taking is a very important function, and thus a camera capable of providing high-quality images and allowing miniaturization is an active research area. Recently, the camera function of a mobile terminal has reached the level of replacing a digital camera, and a small camera module may be mounted and utilized in various devices.

In an optical device represented by a camera, auto focusing (AF) is a representative method for obtaining a clear image of a subject, and there is a need to improve the AF function.

A contrast detection AF system and a phase difference detection AF system are mainly available as AF methods.

Compared to the phase difference detection AF system, the contrast detection AF system is slow because it focuses while moving a lens group, despite the advantage of little error in focusing.

Moreover, the position of a subject may not be estimated with the contrast detection AF system.

Although phase detection may be used to increase the speed of the contrast detection AF system, a separate sensor technology is required for the phase detection.

Accordingly, there is a need to solve the above problem in an optical device that performs AF using the contrast detection AF system.

DISCLOSURE

Technical Problem

An aspect of the present disclosure devised to solve the conventional problem is to provide an optical device with a liquid lens, for reducing time taken for auto focusing (AF) and estimating the position of a subject in a contrast detection AF system, and a mobile terminal including the optical device.

Technical Solution

In an embodiment of the present disclosure, an optical device includes a liquid lens having a curvature varying according to an applied electrical signal, an image sensor configured to convert light passed through the liquid lens to an electrical signal, an image processor configured to calculate a focus value (FV) based on the electrical signal received from the image sensor, a diopter driving unit configured to change the curvature of the liquid lens, a memory configured to store a first curvature state of the liquid lens and a second curvature state corresponding to a distance to a subject after auto focusing in correspondence with an FV slope ratio, and a controller configured to calculate the FV slope ratio in the first curvature state, and control the diopter driving unit to auto focus to the second curvature state based on the FV slope ratio. The FV slope ratio is a ratio of slopes of FVs of a first region and a second region of the liquid lens to a curvature change of the liquid lens according to the distance to the subject in the first curvature state.

In another embodiment of the present disclosure, the controller may be configured to control the diopter driving unit to change the curvature of the liquid lens in the first curvature state at least twice to calculate the FV slope ratio.

In another embodiment of the present disclosure, the image processor may be configured to calculate FVs of the first region and the second region in the first curvature state and FVs of the first region and the second region in a changed curvature state, and the controller may be configured to calculate the FV slope ratio based on the calculated FVs.

In another embodiment of the present disclosure, the controller may be configured to control the diopter driving unit to maintain a curvature change constant, when changing the curvature of the liquid lens at least twice.

In another embodiment of the present disclosure, wherein the controller may be configured to calculate the FV slope ratio, using FVs normalized between the first region and the second region, and the normalized FVs may be values changed to correspond to a case in which the first and second regions are apart from the subject by the same distance.

In another embodiment of the present disclosure, the controller may be configured to change the curvature of the liquid lens to the second curvature state and further perform contrast detection auto focusing.

In another embodiment of the present disclosure, the first region and the second region may be different, and a spherical aberration may be generated between the first region and the second region.

In another embodiment of the present disclosure, an optical device includes a liquid lens having a curvature varying according to an applied electrical signal, an image sensor configured to convert light passed through the liquid lens to an electrical signal, an image processor configured to calculate an FV based on the electrical signal received from the image sensor, a diopter driving unit configured to change the curvature of the liquid lens, a memory, and a controller configured to calculate an FV slope ratio in a first curvature state of the liquid lens, and store the first curvature state of the liquid lens and the FV slope ratio by mapping the first curvature state and the FV slope ratio to a second curvature state corresponding to a distance to a subject. The FV slope ratio is a ratio of slopes of FVs of a first region and a second region of the liquid lens to a curvature change of the liquid lens according to the distance to the subject in the first curvature state.

In another embodiment of the present disclosure, the controller may be configured to change the first curvature state and store the FV slope ratio and the second curvature state in the memory.

In another embodiment of the present disclosure, the controller may be configured to control the diopter driving unit to change the curvature of the liquid lens in the first curvature state at least twice to calculate the FV slope ratio.

In another embodiment of the present disclosure, the image processor may be configured to calculate FVs of the first region and the second region in the first curvature state and FVs of the first region and the second region in a changed curvature state, and the controller may be configured to calculate the FV slope ratio based on the calculated FVs.

In another embodiment of the present disclosure, the controller may be configured to control the diopter driving unit to maintain a curvature change constant, when changing the curvature of the liquid lens at least twice.

In another embodiment of the present disclosure, the first and second regions may be apart from the subject by the same distance.

In another embodiment of the present disclosure, the first region and the second region may be different, and a spherical aberration may be generated between the first region and the second region.

In another embodiment of the present disclosure, a mobile terminal includes a display and an optical device disposed on a front surface of the display. The optical device is the optical device according to the foregoing embodiment.

Advantageous Effects

The optical device according to the present disclosure has the following effects.

According to at least one of embodiments of the present disclosure, a focusing error may be reduced by contrast detection auto focusing (AF) in an optical device using a liquid lens.

Further, according to at least one of embodiments of the present disclosure, time taken for contrast detection AF may be reduced in an optical device using a liquid lens.

Further, according to at least one of embodiments of the present disclosure, the position of a subject may be estimated despite contrast detection AF in an optical device using a liquid lens.

Further, according to at least one of embodiments of the present disclosure, an optical device using a liquid lens does not require a separate sensor technology for phase detection, while reducing time taken for contrast detection AF.

An additional scope of applicability of the present disclosure will become apparent from the following detailed description. However, since various changes and modifications within the spirit and scope of the present disclosure can be clearly understood by those skilled in the art, the detailed description and a specific embodiment such as a preferred embodiment of the present disclosure should be understood as given by way of example only.

BRIEF DESCRIPTION OF THE DRAWINGS

FIG. 1a is a block diagram illustrating a mobile terminal according to an example of the present disclosure.

FIGS. 1b and 1c are conceptual diagrams illustrating an exemplary mobile terminal related to the present disclosure, viewed from different directions.

FIG. 2 is a conceptual sectional diagram illustrating an optical device related to the present disclosure.

FIG. 3 is an exemplary driving block diagram illustrating an optical device with an electro-wetting liquid lens related to the present disclosure.

FIG. 4 is a diagram illustrating contrast detection auto focusing.

FIG. 5 is a diagram comparing a legacy contrast detection auto focusing scheme with an ideal auto focusing scheme.

FIG. 6 is a diagram illustrating an embodiment of regions of a liquid lens, which are compared with each other in terms of focus values (FVs) according to the present disclosure.

FIG. 7 is graphs illustrating the curvatures of the liquid lens corresponding to the FVs of the regions illustrated in FIG. 6.

FIG. 8 is a diagram referred to for describing a case in which there is a spherical aberration between the regions illustrated in FIG. 6.

FIG. 9 is a table listing data stored in a memory of the optical device according to the present disclosure.

FIG. 10 is a diagram referred to for describing a case in which there is no spherical aberration between the regions illustrated in FIG. 6.

FIG. 11 is a diagram illustrating another embodiment of regions an electro-wetting liquid lens, which are compared with each other in terms of FVs according to the present disclosure.

FIG. 12 is a flowchart illustrating an AF method in the optical device according to the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1a to 1c. FIG. 1a is a block diagram of a mobile terminal in accordance with the present disclosure.

FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Further, the controller 180 controls some or all of the components illustrated in FIG. 1a to execute an application program that has been stored in the memory 170. Further, the controller 180 may operate at least two of the components included in the mobile terminal 100 in combination to execute the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above-described components may operate in cooperation with each other to implement operations, control, or control method of the mobile terminal 100 according to various embodiments described below. Further, the operations, control, or control method of the mobile terminal 100 may be performed in the mobile terminal 100 by executing at least one application program stored in the memory 170.

The input unit 120 may be configured to permit various types of input to the mobile terminal 120. Examples of such input include audio, image, video, data, and user input. Image and video input is often obtained using one or more cameras 121.

The camera 121 may be a part of the mobile terminal 100 of the present disclosure or may incorporate the mobile terminal 100 therein. That is, the camera 121 and the mobile terminal 100 of the present disclosure may include at least some common features or components.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). As described above, the controller 180 may process data (or information) corresponding to a proximity touch operation and a proximity touch pattern sensed by the proximity sensor 141. Further, the controller 180 may output visual information corresponding to the processed data to the touch screen. Further, the controller 180 may control the mobile terminal 100 to perform a different operation or a different data (or information) process depending on whether a touch on the same point is a proximity touch or a contact touch.

The touch sensor senses a touch (or touch input) applied to the touch screen (or the display unit 151) in at least one of a resistive scheme, a capacitive scheme, an infrared scheme, an ultrasonic scheme, or a magnetic field scheme.

For example, the touch sensor may be configured to convert a change in pressure applied to a specific portion of the touch screen or capacitance generated in a specific portion of the touch screen to an electrical input signal. The touch sensor may be configured to detect the touched position, touched area, touch pressure, and capacitance at the touch of a touch object that touches the touch screen. The touch object is an object that touches the touch sensor, such as a finger, a touch pen, a stylus pen, or a pointer When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one of a camera sensor (CCD, CMOS etc.), a photo sensor (or image sensors), or a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

Referring to FIGS. 1b and 1c, the mobile terminal 100 includes a bar-type terminal body. However, the present disclosure is applicable to various structures including a watch type, a clip type, a glass type, a folder type having two or more bodies engaged with each other to be relatively movable, a flip type, a slide type, a swing type, a swivel type, and so on, not limited to the bar type. While the present disclosure relates to a specific type of optical device, a description of the specific type of optical device is generally applicable to other types of optical devices.

The terminal body may be understood conceptually as referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 includes a display unit 151, a first and a second audio output modules 152a/152b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1b and 1c. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented as a receiver that provides a call sound to a user's ear. The second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

Input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is configured to receive a user's voice and other sounds. Microphones 122 may be provided at a plurality of positions such that they may receive stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

FIG. 2 is a conceptual sectional diagram illustrating an optical device 200 related to the present disclosure.

The optical device 200 illustrated in FIG. 2 is an example of the camera 121 included in the mobile terminal 100 in FIG. 1a.

The optical device 200 may include an aperture 211, at least one lens 220, and an image sensor 230.

Light reflected or emitted from a subject 1 passes through at least one lens 220 and is refracted. The light which has passed and refracted from the at least one lens 220 reaches the image sensor 230.

The aperture 211 is located at a point in front of the at least one lens 220 in an optical path and adjusts the amount of light reaching the at least one lens 220 and the image sensor 230.

The image sensor 230 may include a red, green, blue (RGB) filter 231 for sensing RGB and a sensor array 232 for converting an optical signal into an electrical signal.

The image sensor 230 may include a mask for phase difference detection at the top or bottom of the RGB filter 231.

An image processor (not shown) may generate an RGB image based on the electrical signal obtained from the image sensor 230.

A plurality of lenses 220 may be provided, and may have a fixed shape such as a glass lens or a plastic lens.

However, when the at least one lens 220 has a fixed shape like a glass lens or a plastic lens and thus a fixed refractive index, the at least one lens 220 has limitations in executing functions such as auto focusing (AF) or image shake correction.

To solve the problem, the at least one lens 220 may be a liquid lens in a variable shape.

Liquid lenses may be classified into a membrane liquid lens deformed by external physical pressure and an electro-wetting liquid lens deformed by electrical interaction.

It may be more easily control the refractive index of the electro-wetting liquid lens than that of the membrane liquid lens, in that the former relies on external physical pressure and the latter relies on external physical pressure, for deformation.

FIG. 3 is an exemplary driving block diagram illustrating the optical device 200 including an electro-wetting liquid lens 400 related to the present disclosure.

The optical device 200 related to the present disclosure may include a lens curvature changing device 500 that changes the curvature of the electro-wetting liquid lens 400, an image sensor 530 that converts light from the electro-wetting liquid lens 400 into an electric signal, and an image processor 540 that performs image processing based on the electrical signal from the image sensor 530.

The optical device 200 related to the present disclosure may further include a gyro sensor 550.

The image processor 540 may output focus information about an image, and the gyro sensor 915 may output optical image stabilization (OIS) information.

The lens curvature changing device 500 according to an embodiment of the present disclosure may include a lens controller 510, a diopter driving unit 520, and a power supply 560.

The lens controller 510 sets a target diopter value for the electro-wetting liquid lens 400 based on the focus information received from the image processor 540, and specifies a voltage value or a pulse width corresponding to the diopter value, so that the diopter driving unit 520 may apply the voltage to the electro-wetting liquid lens 400.

FIG. 4 illustrates an embodiment of subject images corresponding to focus values (FVs) which are changed along with back and forth movements of the lens.

FIG. 4(a) illustrates an embodiment of obtaining a blurry image by rear-focus of a subject. An FV corresponding to the lens position illustrated in FIG. 4(a) does not reach a peak value.

FIG. 4(b) illustrates an embodiment of obtaining a clear image by in-focus of the subject. It may be noted from FIG. 4(b) that an FV corresponding to the lens position matches the peak value.

FIG. 4(c) illustrates an embodiment of obtaining a blurry image by front-focus of the subject. As noted from FIG. 4(c), an FV corresponding to the lens position is obtained past the peak value.

That is, the optical device may calculate FVs while moving the lens back and forth, and set a lens position at which the subject may be captured clearly based on the calculated FVs.

However, since a liquid lens of a variable shape is adopted in the present disclosure, the curvature of the liquid lens may be changed, instead of moving the lens back and forth.

That is, FVs may be calculated, while the curvature of the liquid lens is being changed, and a curvature at which the subject may be captured clearly may be set based on the calculated FVs in the present disclosure.

FIG. 5 is a diagram illustrating a comparison between a legacy contrast detection AF scheme and an ideal AF scheme.

In the conventional contrast detection AF scheme (Legacy Contrast AF), a lens position is detected by comparing FVs calculated by moving a lens from one position after another. That is, a lens position with an FV matching a peak value is detected by moving the lens to different positions one by one. If this scheme is applied to a liquid lens, a curvature of the liquid lens may be detected by comparing FVs calculated by changing the curvature of the lens to different values one by one. However, in this case, much time may be taken for AF.

Therefore, if the lens may reach a position or curvature corresponding to a peak value at once from a current position or curvature as in the ideal AF scheme (Ideal AF) illustrated in FIG. 5, the time required for AF may be shortened.

In the present disclosure, the spherical aberration of the liquid lens is used for the ideal AF (Ideal AF).

Characteristically, a liquid lens having a spherical aberration may have an FV peak at a different position or curvature in a different region of the liquid lens.

That is, the optical device according to the present disclosure may shift the liquid lens to a curvature state at a time, which corresponds to a subject position at which an FV matches a peak value, relying on the property that an FV peak is generated at a different position or curvature in each region due to a spherical aberration.

FIG. 6 illustrates an embodiment of regions of the liquid lens 400, which are compared in terms of FVs according to the present disclosure.

An AF scheme according to the present disclosure may also be applied to a membrane liquid lens, not limited to an electro-wetting liquid lens. Therefore, these lenses are collectively referred to as the liquid lens 400.

For AF of the liquid lens 400 from a first curvature state a to a second curvature state b corresponding to the distance to the subject, the optical device according to the present disclosure may calculate the FVs of a first region 601 and a second region 602 and compare the FVs.

The first region 601 and the second region 602 may be regions which are paired with each other and generate a spherical aberration, among N regions divided from the liquid lens 400.

That is, the optical device according to the present disclosure may perform AF based on the property that the liquid lens generates a spherical aberration.

FIG. 7 is graphs illustrating curvatures of the liquid lens corresponding to FVs of the regions illustrated in FIG. 6.

In FIG. 7, the vertical axis may represent FVs and the horizontal axis may represent curvatures of the liquid lens. The curvature of the liquid lens may vary from a curvature macro suitable for capturing a subject in contact with the liquid lens to a curvature inf suitable for capturing a subject spaced indefinitely from the liquid lens.

FIG. 7(a) is a graph illustrating a case in which there is no spherical aberration between the first region 601 and the second region 602 illustrated in FIG. 6.

When there is no spherical aberration between the first region 601 and the second region 602, positions at which the FVs peak in the first region 601 and the second region 602, that is, curvatures pb suitable for capturing an actual subject may be the same.

However, even in this case, FVs may be different in the first region 601 and the second region 602 at the same curvature. This may be because the distances to the subject actually captured in the first region 601 and the second region 602 may be different.

That is, as illustrated in FIG. 7(a), the FV FV1@p of the first region 601 and the FV FV2@p of the second region 602 may be different at a current curvature (i.e., a first curvature state, p). In addition, the FV FV1@p+1 of the first region 601 and the FV FV2@p+1 of the second region 602 may be different in a first changed curvature state p1. Similarly it may be noted that the FV of the first region 601 is different from the FV of the second region 602 in a second changed curvature state p2.

A normalization process may be used to compensate for the difference, which will be described with reference to FIG. 4 below.

FIGS. 7(b) and 7(c) illustrate cases in which there is a spherical aberration between the first region 601 and the second region 602 illustrated in FIG. 6. FIG. 7(b) illustrates a case in which the first region 601 and the second region 602 illustrated in FIG. 6 have different curvatures Pb for actually capturing a subject, and FIG. 7(c) illustrates a case in which there is a larger spherical aberration than in FIG. 7(b).

It may be noted that the curvature pb suitable for actually capturing the subject in the first region 601 is nearer to the curvature, macro in view of the spherical aberration between the first region 601 and the second region 602.

As the curvature pb suitable for capturing the actual subject in the first region 601 is nearer to the curvature, macro in view of the spherical aberration between the first region 601 and the second region 602, the first region 601 and the second region 602 may have different FV-to-curvature slopes at the current curvature (i.e., the first curvature state, p) of the liquid lens.

That is, the liquid lens may be auto-focused at one time from the current curvature (i.e., the first curvature state, p) to a target curvature corresponding to a distance to the subject (i.e., a second curvature state) based on the FV slope ratio.

For AF at a time from the current curvature (i.e., the first curvature state, p) to the target curvature corresponding to the distance of the subject (i.e., the second curvature state), an optical device according to the present disclosure may include a liquid lens (400 in FIG. 3) having a curvature which varies according to on an applied electrical signal, an image sensor (530 in FIG. 3) that converts light passed through the liquid lens 400 to an electrical signal, an image processor (540 in FIG. 3) that calculates an FV by the electrical signal received from the image sensor 530, a diopter driving unit (520 in FIG. 3) that changes the curvature of the liquid lens 400, a memory that stores the first curvature state p of the liquid lens 400 and the second curvature state of the liquid lens 400 corresponding to a distance of a subject after AF in correspondence with an FV slope ratio, and a controller (500 in FIG. 3) that controls the diopter driving unit 520 to auto-focus the liquid lens to the second curvature state based on the FV slop ratio.

The FV slope ratio may be the ratio of slopes of FVs to a curvature change of the liquid lens 400 between the first region 601 and the second region 602 of the liquid lens 400 according to the distance of the subject in the first curvature state p.

To calculate the FV slope ratio, the controller 500 may control the diopter driving unit 520 to change the curvature of the liquid lens 400 placed in the first curvature state p at least twice.

FIG. 7 illustrates an embodiment of changing the curvature of the liquid lens 400 twice in order to calculate the FV slope ratio, using FVs in the first changed curvature state p1 and the second changed curvature state p2.

Specifically, the image processor 540 according to the present disclosure may calculate the FVs of the first region 601 and the second region 602 in the first curvature state p and the FVs of the first region 601 and the second region 602 in the changed curvature states p1 and p2, and the controller 500 may calculate an FV slope ratio based on the calculated FVs, FV1@p, FV1@p+1, FV1@p+2, FV2@p, FV2@p+1, and FV2@p+2.

When at least changing the curvature of the liquid lens 400, the controller 500 may control the diopter driving unit 520 to use a constant curvature increment/decrement (delta in FIG. 8).

That is, the difference delta between the first curvature state and the first changed curvature state p1 may be equal to the difference delta between the first changed curvature state p1 and the second changed curvature state p2.

The FVs of the first region 601 and the second region 602 may vary according to the distances from the first region 601 and the second region 602 to the subject as well as the spherical aberration.

Accordingly, normalization may be required to eliminate the difference between the distances to the subject in the FV difference between the first region 601 and the second region 602. With reference to FIG. 8, a normalization process will be described below.

FIG. 8 is a diagram illustrating a method of comparing FV slopes, when there is a spherical aberration between the regions of FIG. 6.

FIG. 8 illustrates an embodiment in which the curvature pb of the second region 602 suitable for capturing an actual subject is nearer to the curvature macro due to the spherical aberration of the first region 601.

That is, it may be noted that curvatures pb (the curvatures of the liquid lens with FVs at peak values) suitable for capturing an actual subject in the first region 601 and the second region 602 are different from each other by a value, best pos.

That is, the slopes of FVs of the first region 601 and the second region 602 to a curvature change of the liquid lens (400 in FIG. 3) in the first curvature state p may be compared after normalization.

The normalization is performed to remove factors caused by the difference between the locations of a captured subject in the first region 601 and the second region 602 from the FV slopes and thus consider only factors caused by a spherical aberration. Further, the normalization is related to a step of making a table 800 which will be described with reference to FIG. 9. The step will be described in detail with reference to FIG. 9.

That is, the controller (500 in FIG. 3) of the present disclosure may calculate a ratio of FV slopes using the normalized FVs of the first region 601 and the second region 602. The normalized FVs may be FVs changed to match values obtained when the distance to the subject is equal between the first region 601 and the second region 602.

Specifically, the ratio of slopes of the normalized FVs is calculated in the following procedure.

Referring to FIG. 8(*a*), the FV FV1@p of the first region 601 and the FV FV2@p of the second region 602 in the first curvature state p may be calculated. Then, after the curvature of the liquid lens (400 in FIG. 5) is changed by delta, the FV FV1@p+1 of the first region 601 and the FV FV2@p+1 of the second region 602 in the second curvature state p1 may be calculated. Similarly, the curvature of the liquid lens (400 in FIG. 5) is further changed by delta, and then the FV FV1@p+2 of the first region 601 and the FV FV2@p+2 of the second region 602 in the second curvature state p2 may be calculated.

The normalization may be a process of matching the FV FV1@p to the FV FV2@p by vertically shifting the FV curve of the first region 601 or the second region 602, and matching FV1@p+1 to FV2@p+1 by vertically shifting the FV curve of the first region 601 or the second region 602.

FV1@p+2 or FV2@p+2 may be changed by the normalization.

The ratio of slopes of FVs of the first region 601 and the second region 602 to a curvature change of the liquid lens in the first curvature state p may be calculated using the normalized FVs.

The slope S1 of FVs in the first region 601 may be defined as the ratio of the difference f1 between the normalized FVs, FV1@p+1 and FV1@p+2 to delta. The slope S2 of FVs in the second region 602 may be defined as the ratio of the difference f2 between the normalized FVs, FV2@p+1 and FV2@p+2 to delta.

Because the focal length shifts are equally delta, S1 may be defined as the ratio of f1+c to 2*delta, and S2 may be defined as the ratio of f2+c to 2*delta, where c is the difference between the normalized FVs, FV1@p and FV1@p+1.

The FV slope ratio r_slopes between the first region 601 and the second region 602 is expressed as S2/S1.

This process is summarized as follows.

$$S1 = f1/\text{delta} = (f1+c)/(2*\text{delta})$$

$$S2 = f2/\text{delta} = (f2+c)/(2*\text{delta})$$

$$f1 = FV1@p+2 - FV1@p+1$$

$$f2 = FV2@p+2 - FV2@p+1$$

$$c = FV1@p+1 - FV1@p = FV2@+1 - FV2@p$$

$$r\_slopes = S2/S1$$

FIG. 8(*a*) illustrates a case of a large FV difference, and FIG. 8(*b*) illustrates a case of a small FV difference. The same slope ratio between the first region 601 and the second region 602 may be obtained by the above normalization procedure, regardless of the FV differences.

As described before, to enable an optical device (200 in FIG. 3) according to the present disclosure to shift from a current curvature state (i.e., the first curvature state p) to a curvature state corresponding to the distance to a subject (i.e., the second curvature state) based on data stored in a memory, the required data should be stored in the memory.

That is, the optical device 200 of the present disclosure should pre-store first curvature state information, an FV slope ratio, r-slopes according to positions of a subject in the first curvature state p, and second curvature state information corresponding to the first curvature state p and the FV slope ratio, r-slopes in the memory.

Now, a description will be given of the optical device including the data in the memory.

FIG. 9 is a table 800 listing data stored in a memory of an optical device (200 in FIG. 3) according to the present disclosure.

Lens positions 1 to N represent curvatures ranging from macro to infinite in a first curvature state (p in FIG. 4) of a liquid lens (400 in FIG. 3).

Ratio of Slopes represents a slope ratio r_slopes calculated in FIG. 4.

Best pos. (1 to N) represents a curvature state suitable for capturing a subject, at which an FV is peaked (i.e., a second curvature state).

Specifically, the table 800 may be laid out by measuring a slope ratio between a specific pair of regions in the liquid lens 400, while changing the position of a subject from macro to infinite for each lens position 1 to N and mapping the data of the slope ratios to Best pos. (1 to N).

The table 800 illustrated in FIG. 9 may include an embodiment of constructing data for the first region 601 and the second region 602 of FIG. 6, and a different table may be made for each pair of regions.

To store the table 800 of FIG. 9 in a memory 513, the optical device according to the present disclosure may include the liquid lens 400 having a curvature that varies according to an applied electrical signal, the image sensor (530 in FIG. 3) that converts light passed through the liquid lens 400 to an electrical signal, the image processor (540 in FIG. 3) that calculates an FV from the electrical signal received from the image sensor 530, the diopter driving unit (520 in FIG. 3) that changes the curvature of the liquid lens 400, the memory, and the controller (500 in FIG. 3) that calculates an FV slope ratio according to distances to a subject in the first curvature state (p in FIG. 4) of the liquid lens 400 and stores the first curvature state p and the FV slope ratio by mapping them to a second curvature state corresponding to a distance to the subject in the memory.

The FV slope ratio may be the ratio between the slopes of FVs of the first region (601 in FIG. 4) and the second region (602 in FIG. 8) of the liquid lens 400 to a curvature change of the liquid lens 400.

The controller 500 may change the first curvature state p and store the FV slope ratio and the second curvature state in the memory 513. Changing the first curvature state p by the controller 500 amounts to changing a lens position from 1 to N in the table 800 of FIG. 9.

Specifically, the image processor 540 may calculate the FVs of the first region 601 and the second region 602 in the first curvature state p and the FVs of the first region 601 and the second region 602 in a changed curvature state. The controller 500 may calculate an FV slope ratio based on the calculated FVs.

Best pos. (1 to N) included in the table 800 of FIG. 9 may be obtained by the legacy contrast detection AF scheme. Since the legacy contrast detection AF scheme is used only in constructing data, it may not be related to an actual AF procedure.

However, Best pos. (1 to N) included in the table 800 of FIG. 9 is data calculated according to positions of a subject. It may be difficult to calculate data for all cases of continuously changing the position of the subject from macro to infinite.

Accordingly, when performing AF in the optical device 200 according to the present disclosure, the controller 500 may detect Best pos. (1 to N) (i.e., the second curvature state) using a value approximate to Ratio of Slopes measured at a specific lens position (1 to N) (i.e., the first curvature state), change the curvature of the liquid lens to the second curvature state, and then further perform AF in the legacy contrast detection AF scheme.

When the table 800 of FIG. 9 is made, the subject may be a plane parallel to the liquid lens 400. That is, the first region 601 and the second region 602 may be apart from the subject by the same distance. Because the subject is the plane parallel to the liquid lens 400, the above-described normalization process may be required for AF in making the table 800.

The lens positions (1 to N) in the table 800 of FIG. 9 may be lens curvature states including spherical aberrations. This is because the present disclosure is characterized by AF based on the spherical aberration of a lens. Accordingly, the first region 601 and the second region 602 are different and thus may include a spherical aberration therebetween.

On the contrary, it is difficult to implement the present disclosure in the absence of a spherical aberration in the lens. This is because the first region 601 and the second region 602 provide the same focus information. That is, the FV slope ratio is 1, which will be described below in detail.

FIG. 10 is a diagram illustrating a case in which there is no spherical aberration between regions.

When the FV slope ratio between the first region 601 and the second region 602 is 1, information about a curvature state suitable for capturing a subject (i.e., the second curvature state) may not be obtained. This is substantially the same even when the FV measurements of the first region 601 and the second region 602 are different. This is because the above-described normalization process is performed.

FIG. 10(a) is a graph illustrating a case of a small FV difference between the first region 601 and the second region 602 without a spherical aberration of the liquid lens, and FIG. 10(b) is a graph illustrating a case of a large FV difference between the first region 601 and the second region 602 without a spherical aberration of the liquid lens.

The FV difference between the first region 601 and the second region 602 is attributed to different distances from the first region 601 and the second region 602 to the subject, and it may be noted from FIGS. 10(a) and 10(b) that the FV curves coincide with each other by normalization.

That is, the FV slope ratio becomes 1 by normalization regardless of the FV difference between the first region 601 and the second region 602.

While the above description is given in the context of a comparison in a single pair of regions on a liquid lens, a plurality of pairs of regions may be compared with each other to increase accuracy.

FIG. 11 is a diagram illustrating another embodiment of regions of the electro-wetting liquid lens 400, from which FVs are calculated according to the present disclosure.

That is, an optical device (200 in FIG. 3) according to the present disclosure may shift to a target curvature state by comparing the second region 602 with a third region 603 in addition to comparison between the first region 601 and the second region 602.

FIG. 12 is a flowchart illustrating an AF method in an optical device (200 in FIG. 3) according to the present disclosure.

As described before, the optical device 200 according to the present disclosure operates mainly in the following two flows.

One of the flows is AF based on data illustrated in FIG. 9, and the other flow is acquisition of the data illustrated in FIG. 9.

The second flow has been described before with reference to FIG. 9, and the first flow will be described methodologically.

The optical device 200 according to the present disclosure obtains FVs at a current position (i.e., the first curvature state p in FIG. 4) (S801).

The optical device 200 according to the present disclosure may then obtain FVs by shifting the liquid lens twice (i.e., changing the curvature of the liquid lens twice) (S802 and S803).

The optical device 200 according to the present disclosure may obtain FVs three times and normalize curves illustrating FVs with respect to focal lengths (S804). The normalization is a process of changing FVs measured in a first region and a second region to FVs matching a subject at the same distance from the first and second regions, which has been described in detail with reference to FIG. 8.

The optical device 200 according to the present disclosure may calculate the ratio of slopes of FVs between the first region (601 in FIG. 8) and the second region (602 in FIG. 8) after the measured FVs are normalized (S805).

Once the ratio of slopes of FVs is calculated, the optical device 200 according to the present disclosure may obtain a best position (i.e., a second curvature state) corresponding to the current lens position p and the ratio of slopes, R_slopes based on information constructed as data in the second flow (S806).

Subsequently, the optical device 200 according to the present disclosure may change the lens to the second curvature state at a time (S807).

That is, the optical device according to the present disclosure may shorten time taken for contrast detection AF by shifting the lens to a target curvature state through three movements (two movements are for detecting FVs and one movement is for shifting to the target curvature state).

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. An optical device comprising:
a liquid lens having a curvature varying according to an applied electrical signal;
an image sensor configured to convert light passed through the liquid lens to an electrical signal;
an image processor configured to calculate a focus value (FV) based on the electrical signal received from the image sensor;
a diopter driving unit configured to change the curvature of the liquid lens;
a memory configured to store a first curvature state of the liquid lens and a second curvature state corresponding to a distance to a subject after auto focusing in correspondence with an FV slope ratio; and
a controller configured to calculate the FV slope ratio in the first curvature state, and control the diopter driving unit to auto focus to the second curvature state based on the FV slope ratio,
wherein the FV slope ratio is a ratio of slopes of FVs of a first region and a second region of the liquid lens to a curvature change of the liquid lens according to the distance to the subject in the first curvature state.

2. The optical device according to claim 1, wherein the controller is configured to control the diopter driving unit to change the curvature of the liquid lens in the first curvature state at least twice to calculate the FV slope ratio.

3. The optical device according to claim 2, wherein the image processor is configured to calculate FVs of the first region and the second region in the first curvature state and FVs of the first region and the second region in a changed curvature state, and the controller is configured to calculate the FV slope ratio based on the calculated FVs.

4. The optical device according to claim 3, wherein the controller is configured to control the diopter driving unit to maintain a curvature change constant, when changing the curvature of the liquid lens at least twice.

5. The optical device according to claim 4, wherein the controller is configured to calculate the FV slope ratio, using FVs normalized between the first region and the second region, and the normalized FVs are values changed to correspond to a case in which the first and second regions are apart from the subject by the same distance.

6. The optical device according to claim 1, wherein the controller is configured to change the curvature of the liquid lens to the second curvature state and further perform contrast detection auto focusing.

7. The optical device according to claim 1, wherein the first region and the second region are different, and a spherical aberration is generated between the first region and the second region.

8. An optical device comprising:
a liquid lens having a curvature varying according to an applied electrical signal;
an image sensor configured to convert light passed through the liquid lens to an electrical signal;
an image processor configured to calculate a focus value (FV) based on the electrical signal received from the image sensor;
a diopter driving unit configured to change the curvature of the liquid lens;
a memory; and
a controller configured to calculate an FV slope ratio in a first curvature state of the liquid lens, and store the first curvature state of the liquid lens and the FV slope ratio by mapping the first curvature state and the FV slope ratio to a second curvature state corresponding to a distance to a subject,
wherein the FV slope ratio is a ratio of slopes of FVs of a first region and a second region of the liquid lens to a curvature change of the liquid lens according to the distance to the subject in the first curvature state.

9. The optical device according to claim 8, wherein the controller is configured to change the first curvature state and store the FV slope ratio and the second curvature state in the memory.

10. The optical device according to claim 9, wherein the controller is configured to control the diopter driving unit to change the curvature of the liquid lens in the first curvature state at least twice to calculate the FV slope ratio.

11. The optical device according to claim 10, wherein the image processor is configured to calculate FVs of the first region and the second region in the first curvature state and FVs of the first region and the second region in a changed curvature state, and the controller is configured to calculate the FV slope ratio based on the calculated FVs.

12. The optical device according to claim 11, wherein the controller is configured to control the diopter driving unit to maintain a curvature change constant, when changing the curvature of the liquid lens at least twice.

13. The optical device according to claim 8, wherein the first and second regions are apart from the subject by the same distance.

14. The optical device according to claim 8, wherein the first region and the second region are different, and a spherical aberration is generated between the first region and the second region.

* * * * *